United States Patent [19]
Ballu

[11] 3,919,847
[45] Nov. 18, 1975

[54] FLOATING ANTI-POLLUTION BARRIER

[75] Inventor: Louis Ballu, Colombes, France

[73] Assignee: Pneumatiques, Caoutchouc Manufacture et plastiques Kleber-Colombes, France

[22] Filed: Nov. 27, 1973

[21] Appl. No.: 419,334

[30] Foreign Application Priority Data
Nov. 27, 1972 France .............................. 72.42160

[52] U.S. Cl. ...?.............................................. 61/1 F
[51] Int. Cl.² ......................................... E02B 15/04
[58] Field of Search ......... 210/242, DIG. 21; 61/1 F

[56] References Cited
UNITED STATES PATENTS

| | | | |
|---|---|---|---|
| 3,564,852 | 8/1969 | Smith | 61/1 F |
| 3,577,879 | 5/1971 | Durcrcq | 61/1 F |
| 3,579,994 | 5/1971 | Preus | 61/1 F |
| 3,592,006 | 7/1971 | Crucet | 61/1 F |
| 3,597,924 | 8/1971 | Rism | 61/1 F |
| 3,713,410 | 1/1973 | Ducrocq et al | 61/1 F |
| 3,718,001 | 2/1973 | Harper | 61/1 F |
| 3,751,925 | 8/1973 | Thurman | 61/1 F |
| 3,757,526 | 9/1973 | Larsson | 61/1 F |
| 3,775,982 | 12/1973 | Lamboley | 61/1 F |
| 3,792,589 | 2/1974 | Sayles | 61/1 F |
| 3,798,911 | 3/1974 | Oberg | 61/1 F |
| 3,807,177 | 4/1974 | Oberg | 61/1 F |
| 3,811,285 | 5/1974 | Ballu | 61/1 F |

FOREIGN PATENTS OR APPLICATIONS

| | | | |
|---|---|---|---|
| 1,243,176 | 8/1971 | United Kingdom | 61/1 F |
| 323,926 | 11/1970 | Sweden | 61/1 F |

*Primary Examiner*—Theodore A. Granger
*Attorney, Agent, or Firm*—Craig & Antonelli

[57] ABSTRACT

A floating barrier intended to catch floating materials on the surface of the water and including a skirt and a floating element extending over the entire length of the skirt, characterized in that the floating element consists of a series of sealed compartments forming closed containers interlinked by a strip of fabric.

8 Claims, 6 Drawing Figures

FLOATING ANTI-POLLUTION BARRIER

The present invention relates to floating antipollution barriers used to catch floating articles or substances.

The barriers to which the invention relate are those consiting of one or more floating elements and a skirt made of flexible material such as a fabric impregnated with rubber or a similar material.

Barriers of this type are constituted by assembling relatively long elements, for example, 10 or 15m in length. As is represented partially in elevation in FIG. 1 and in a transversal sectional view in FIG. 2, each element consists of a floating element which is a tube 1 extending over the length of a skirt 2 ballasted by a chain 3 secured to the skirt 2 by means of rings. When the tube is filled with air or a substance having a low density, even if the latter is in the form of spheres or other particles, it forms a sort of beam having a certain amount of longitudinal rigidity. This rigidity is sufficient to prevent it from permanently taking the shape of the swell as, owing to this rigidity, each part cannot permanently adapt itself to the localized variations in the water level by following these variations, especially when they are considerable as is the case at high tide. As a result, when there is a strong swell, the materials which it is desired to catch pass over the barrier because at certain points the immersed height of the skirt is insufficient and because at other points, the water passes over the tube.

The same disadvantages remain when, for safety reasons, the floating element is divided into a plurality of independent compartments by transversal partitions which are secured over the entire periphery of the tube and which do not alter the longitudinal rigidity of the latter.

Barriers of a different type to the barriers according to the invention are already known; these barriers consisting of a vertical curtain, at the upper part of which floating elements are secured at intervals. These barriers have the same disadvantages as those mentioned above; an excess of longitudinal rigidity resulting in part from the height of the curtain which is fairly considerable, and in addition, the difficulty of adapting to the swell owing to the spacing of the floating elements.

The present invention relates to a floating barrier which adapts perfectly to the shape of the swell and which remains effective when existing barriers would no longer do so.

The barriers according to the invention comprise a skirt which is supported by a floating element which extends over the entire length of the skirt but which consists of a series of sealed compartments made of a flexible fabric. These compartments do not communicate with each other and are interconnected by means of strips of fabric, the width of which is between 5 and 20% of the distance separating two consecutive strips.

The barriers according to the invention are produced by constructing entirely each of the closed sealed compartments and then by joining the strips so as to interlink the different compartments and simultaneously to ensure sealing between these different compartments. The barriers according to the invention may also be produced by first making a tube as used in the existing barriers (for example by bending back a strip of fabric coated with rubber and then bonding together its longitudinal edges) and then in applying one against the other the walls opposite the places where the strips are to be located and attaching them together by gluing or bonding. This method of procedure has the advantage of a simple manufacturing method since the compartments and the strips situated between these compartments are provided simultaneously in a simple manner. This method of procedure also has the advantage that the compartments thus produced, when they are shaped in the manner which will be described hereafter are provided at their upper part with two upwardly directed extensions and a number of folds providing them with longitudinal flexibility of their own. In this way, not only is the barrier rendered longitudinally flexible by the articulations constituted by the strips but each of the compartments possesses its own flexibility.

The compartments are closed containers. They may be inflated with air but this necessitates an inflation operation per compartment and thus a fairly long period of time to prepare the barrier. Thus, it is often preferable to place inside these compartments a substance or mechanical element which gives them a shape and keeps them in this shape so that the volume of water which they displace is sufficient to ensure adequate floatability. In this case, at the time of manufacture, each of the compartments is provided with an opening which is closed by a known means — which is independent of the invention — for example, a slide fastener, after the compartment has been given its shape by the introduction of the substance or a mechanical element.

Other features and advantages of the present invention will be made apparent from the following description of an embodiment of the invention which is represented by way of example only and is represented in the accompanying drawings, in which.

Figure 1:
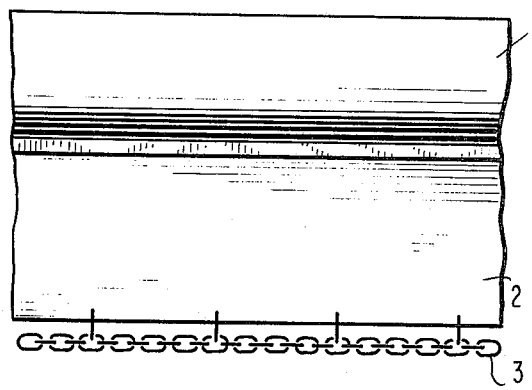
FIG. 1 is an elevational view of a prior art arrangement.
Figure 2:
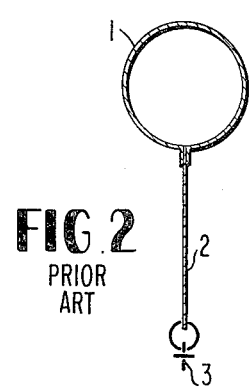
FIG. 2 is a transverse section of the arrangement of FIG. 1.
Figure 3:
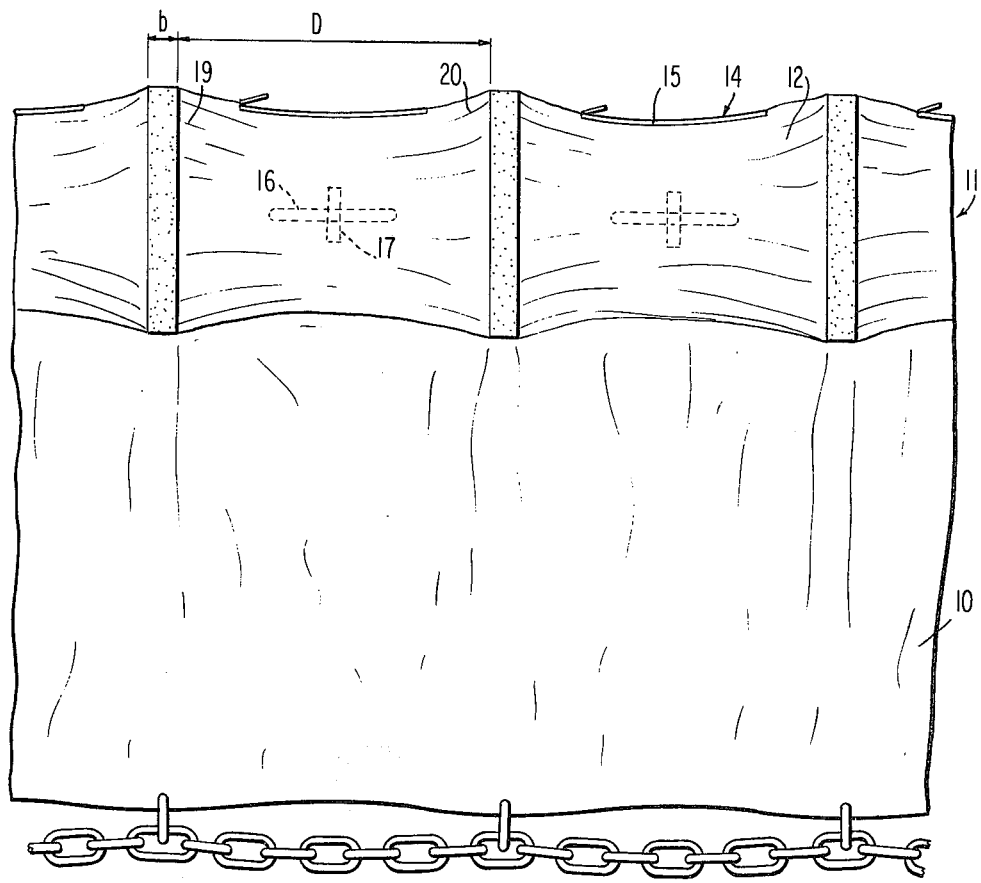
FIG. 3 is a front view of a part of a floating barrier according to the invention which is ready to be placed in the water.
Figure 4:
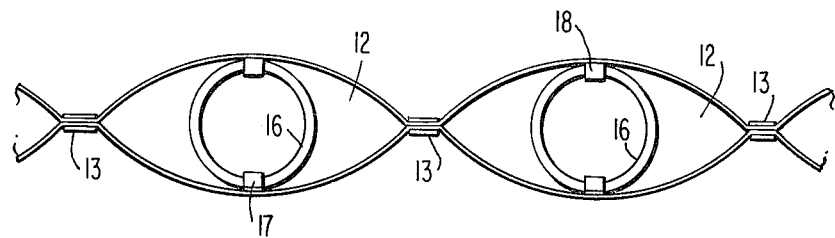
FIG. 4 is a view from above of the barrier according to FIG. 3.

As in the case of the barrier according to FIGS. 1 and 2, the barrier shown in FIGS. 3 and 4 consists of a skirt 10 and a floating element 11 which extends over the entire length of the skirt 10. This floating element consists of a series of compartments 12 which are sealed and do not communicate with each other. The different compartments 12 are interconnected by strips 13 which ensure that there is no discontinuity between the compartments.

The skirt 10, the compartments 12 and the strips 13 are made of a fabric which has been treated so as to seal it against penetration by water, for example, by coating it with rubber or a plastic material.

The width of the strips 13 must be sufficient to enable the compartments 12 to be displaced vertically independent of each other and it should not be too great so as to prevent the compartments from being deformed excessively under the action of transversal stresses as this would open a passage to the materials it is desired to catch. This width is between 5 and 20% of the distance D separating two consecutive strips, that is, 5 – 20% of the length of the compartments 12.

The compartments 12 are formed so as to displace a sufficient volume of water to ensure that the barrier floats, either by the introduction of a light, gaseous or solid body such as air at a pressure slightly above atmospheric pressure, or a cellular material in block form or in fragments, for example, cellular polystyrene pellets such as chips, or by the arrangement of a rigid mechanical element such as a ring which spaces apart the walls of the compartments 12 and keeps them apart. However, all these compartments are formed as closed, sealed containers.

If air is used, each compartment comprises an inflating valve but the inflation of each of these compartments is an operation which generally takes too long and cannot be considered for preparing the barrier.

If a solid, light material is used such as a cellular material or a chip-form material, each of these compartments 12 is provided, preferably at its upper part, with an aperture 14 which comprises a closing means, preferably a rapid closing means such as a slide fastener 15. The material is introduced by way of the aperture 14 which is then closed. The same applies if the compartments 12 are formed and kept in shape by mechanical means such as a ring. If this mechanical means has been inserted during manufacture of the compartment, it is generally necessary to move it aside, that is, to apply it against a wall so that, being in the plane of the skirt, it does not prevent the storage of the barrier in a limited space. During preparation of the barrier it is necessary to place it in such a position that it spaces apart the walls of the compartments and keeps them spaced apart. This makes it necessary to be able to actually reach the inside of each compartment. If, on the other hand, when preparing the barrier, the mechanical means are only inserted before placing the barrier in water, it is also necessary to get to the inside of each compartment.

In the embodiment represented, the walls of each compartment are separated from each other and thus each compartment is given its shape by a ring 16 which was secured to a wall during manufacture of the barrier in such a way that it is adapted to pivot about this attachment which consists of a simple strip of fabric attached to the wall and passing through the ring. The opposite wall is provided with a hook 18 in which the ring is placed and held fast during preparation of the barrier. After the rings 16 have been inserted in the hooks 18, thereby spacing the walls of the compartments and giving shape to the latter, by intervention through the opening 14, this opening is closed by means of a slide fastener 15 so that each compartment is sealed.

As the surface of the compartments formed is not developable, folds and two extensions 19 and 20 at their ends are produced. This provides each compartment with its own longitudinal flexibility. The same applies to the folds which are formed in the skirt.

Figure 5:
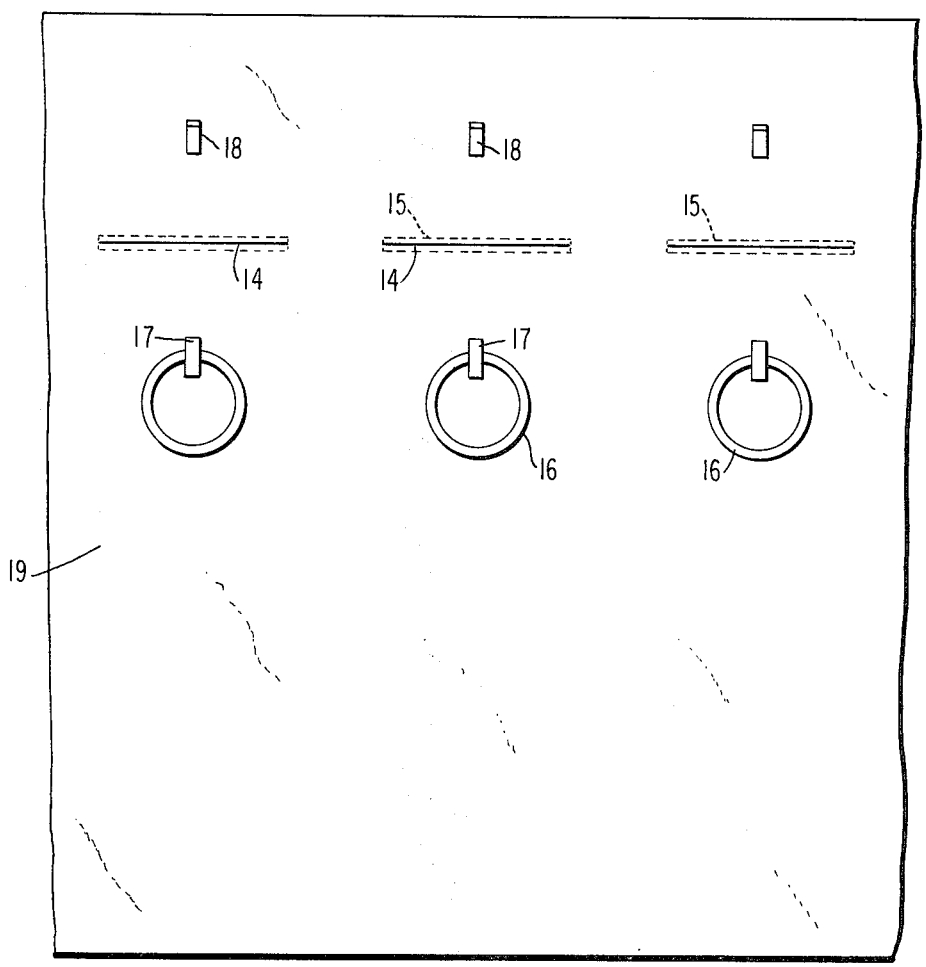
FIGS. 5 and 6 illustrate the method of manufacturing the barrier according to FIGS. 3 and 4.
Figure 6:
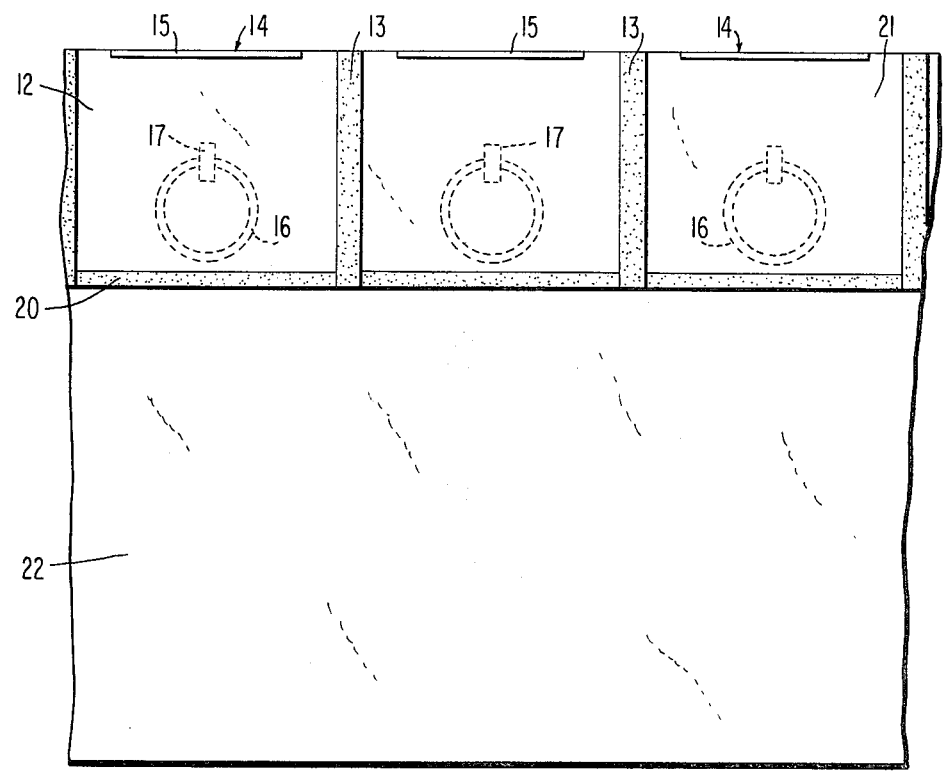

To produce a barrier corresponding to the one shown in FIGS. 3 and 4, it is possible to proceed in the manner represented diagrammatically in FIGS. 5 and 6.

The rings 16 secured by strips of fabric 17 are applied to a strip of fabric 19 coated with a thermo-bondable, thermoplastic material such as polyvinylchloride. The hooks 18 which, in the finished barrier, are situated on the wall of the compartment opposite to the wall bearing the strip of fabric 17 are at this stage of manufacure placed above the latter. On the other face of the fabric these openings are provided with a slide fastener 15. The lateral part of the fabric strip to which are attached the hooks 18 is then folded back on itself as represented in FIG. 6 along the line passing through the openings 14. The free edge of this part is then bonded at 20 to the fabric strip. In this way, a type of channel 21 in which the rings are located is obtained. This channel is integral with a part 22 of the fabric strip which will constitute the skirt. The walls of the channel 21 are then bonded together at intervals between the rings. In this way, the compartments 12 and the strips 13 can be produced simultaneously. The width of the bonded sections is obviously equal to that of the strips 13.

In another embodiment of the invention which is not shown in the drawings, the compartments 12 are given shape by introducing through the openings 14 cylindrical blocks of expanded polystyrene or another material having a low density. The diameter of these blocks is equal to the distance at which it is wished to space the walls opposite the compartments 12, but it is smaller than the length of the compartments 12. The expanded polystyrene blocks, the axes of which are vertical, have the essential role of giving some shape to the compartments 12, the volume of which and thus the floating capacity of which is greater than that of these blocks.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What I claim is:

1. A floating barrier for catching floating materials on the surface of water, comprising a skirt and a floating element secured to one edge of said skirt over the entire length thereof, said floating element consisting essentially of a series of sealed compartments forming closed containers and a series of strips of fabric interlinking said compartments at a separation providing flexibility of said floating element, each of said compartments including a ring pivotally mounted to an interior side wall of the compartment for being movable between a first inoperative position substantially parallel to said side wall and a second operative position substantially perpendicular to said side wall to provide shape to said compartment, releasable connecting means mounted on a second interior side wall of said compartment opposite to the pivotal mounting of said ring for holding said ring in said second operative position, access means formed in a portion of said compartment for providing access into the interior of said compartment sufficient to change the ring position, and sealing closure means connected to said access means for selectively sealingly closing said access means.

2. A floating barrier according to claim 1, wherein each of said strips separate two consecutive compartments by a distance between 5 and 20% of the longitudinal dimension of said compartments.

3. A floating barrier according to claim 1, wherein said strips of fabric are substantially rectangular in shape and are disposed in the plane of said skirt, each of said strips having the long sides thereof secured to respective ones of said compartments.

4. A floating barrier according to claim 1, wherein said compartments are formed of water impervious fabric.

5. A floating barrier according to claim 1, wherein said compartments are each formed of first and second substantially rectangular panels secured to one another at corresponding edges.

6. A floating barrier according to claim 1, wherein said ring is pivotally mounted to said side wall by means of a fabric strip passing through said ring and having the ends thereof secured to said side wall.

7. A floating barrier according to claim 1, wherein said releasable connecting means consists of a hook secured to said second side wall.

8. A floating barrier according to claim 1, wherein said sealing closure means consists of a slide fastener.

* * * * *